(12) United States Patent
Nakayama et al.

(10) Patent No.: US 6,791,456 B2
(45) Date of Patent: Sep. 14, 2004

(54) VEHICULAR REPORTING SYSTEM (75) Inventors: Kengo Nakayama, Saitama (JP);
Yoshifumi Mochizuki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/046,815

(22) Filed: Jan. 17, 2002

(65) Prior Publication Data

US 2002/0093419 A1 Jul. 18, 2002

(30) Foreign Application Priority Data

Jan. 17, 2001 (JP) .......................................... 2001-009071
Nov. 16, 2001 (JP) .......................................... 2001-351403

(51) Int. Cl.$^7$ .............................................. B60R 25/10
(52) U.S. Cl. ...................... 340/429; 340/426.3; 340/989
(58) Field of Search ................................ 340/988, 989, 340/991, 992, 993, 995.1, 902, 905, 426.3, 572.5, 572.7, 572.8, 286.01, 10.1, 10.6, 999, 429; 342/457, 458, 463

(56) References Cited

U.S. PATENT DOCUMENTS

| | | | | |
|---|---|---|---|---|
| 5,223,844 A | * | 6/1993 | Mansell et al. | 342/457 |
| 5,353,023 A | * | 10/1994 | Mitsugi | 340/989 |
| 6,127,947 A | * | 10/2000 | Uchida et al. | 340/999 |
| 6,222,463 B1 | * | 4/2001 | Rai | 340/988 |
| 6,359,570 B1 | * | 3/2002 | Adcox et al. | 340/902 |
| 6,429,773 B1 | * | 8/2002 | Schuyler | 340/425.5 |
| 6,437,743 B1 | * | 8/2002 | Mintz et al. | 342/463 |
| 6,509,868 B2 | * | 1/2003 | Flick | 340/467 |
| 6,549,130 B1 | * | 4/2003 | Joao | 340/539.1 |

FOREIGN PATENT DOCUMENTS

| | | |
|---|---|---|
| DE | 42 20 963 A | 1/1993 |
| JP | 61-30450 A | 2/1986 |
| JP | 5-5626 A | 1/1993 |
| JP | 2665478 B2 | 6/1997 |
| WO | WO 90 03899 A | 4/1990 |

* cited by examiner

Primary Examiner—Van T. Trieu
(74) Attorney, Agent, or Firm—Birch, Stewart, Kolasch & Birch, LLP (57) ABSTRACT

To make it possible to take appropriate action promptly in response to a report from a vehicle of an abnormality such as a theft, an accident, or a failure. A terminal apparatus is included in vehicles to transmit an abnormality report and thereby providing a notification of the occurrence of an abnormality to a control apparatus. The terminal apparatus includes abnormality information C from an abnormality detecting sensor, identifying information A of the vehicle, attribute information D for indicating attributes of the vehicle itself, and position information D of the vehicle. The control apparatus can thereby detect the occurrence of the abnormality of the vehicle, identify the vehicle having the abnormality, identify the attributes of the vehicle having the abnormality, and identify the location where the abnormality has occurred. It is thus possible to take appropriate action promptly such as sending an appropriate report and sending an appropriate request to a maintenance service.

18 Claims, 6 Drawing Sheets

VEHICULAR REPORTING SYSTEM

CROSS-REFERENCE TO RELATED APPLICATIONS

The present application claims priority under 35 USC 119 to Japanese Patent Application No. 2001-009071 filed on Jan. 17, 2001 and Japanese Patent Application No. 2001-351403 filed on Nov. 16, 2001 the entire contents thereof are hereby incorporated by reference.

BACKGROUND OF THE INVENTION

1. Field of the Invention

The present invention relates to a system for transmitting attribute information representing characteristics of a vehicle by radio, and a system for reporting by radio of an abnormality of the vehicle, such as a theft, a failure, or an accident, and particularly to a technique that makes it possible to identify and locate the vehicle and also grasp attributes of the vehicle such as the producer and the type of the vehicle by the report.

2. Description of Background Art

Conventionally, various inventions have been proposed to deal with the theft of a vehicle.

Japanese Patent Laid-Open No. Sho 61-30450 proposes a vehicle theft preventing system in which theft detecting means and transmitting means are provided for a vehicle. A display is carried by the owner of the vehicle who receives a theft detecting signal from the vehicle and displays the theft detecting signal on the display. The display transmits a signal to activate an alarm provided on the vehicle.

Japanese Patent No. 2665478 Publication proposes an anti-vehicle-theft system in which a theft detector and a position detector are provided on a vehicle. The position detector is activated in response to the theft detector detecting a theft and then automatically transmits position information.

Recently, navigation systems employing a positioning system (GPS: Global Positioning System) using satellites have been incorporated in a number of vehicles. Japanese Patent Laid-Open No. Hei 5-5626 proposes an accident information reporting system utilizing position information that can be obtained by a vehicle using such a navigation system. Specifically, the navigation system is provided with means for detecting an accident to the vehicle and transmitting means. When the occurrence of an accident to the vehicle is detected, the navigation system automatically transmits accident information and information on where the accident has occurred to the police, the JAF or the like.

In addition, recent developments relating to radio communication systems have brought a positioning service using a PHS (Personal Handyphone System), which makes it possible to locate the PHS communication terminal by determining which base station apparatus has a radio communication service area where the terminal is located.

However, although the conventional inventions for dealing with theft and accidents may provide position information, the conventional inventions simply report a theft and an accident. Therefore, it is difficult to take action adequately in response to the report.

Specifically, in a case where a vehicle is stolen, it is not possible to search for the stolen vehicle if attributes of the vehicle itself, such as the name of the producer, the type, and the body color of the vehicle, are not known. Thus, the search is begun after identifying the attributes representing characteristics of the vehicle by interviewing the owner of the stolen vehicle, for example, and therefore it is not possible to take appropriate action promptly.

Even if the vehicle belongs to a particular vehicle type, attributes in terms of appearance, which enable identification of the particular vehicle at a glance, may be changed by replacing wheels, pasting a sticker on the body of the vehicle, attaching a TV antenna or the like, replacing seats or seat covers visible from outside the vehicle, and other work done by the user as required. Some measures are required to deal with such a change in the attributes by the user after purchase of the vehicle. Such conditions are especially noticeable in the case of motorcycles. A user often not only pastes a sticker on the body of the vehicle but also replaces parts that change the appearance of the motorcycle, such as a muffler, a fender, and an air cleaner box, as so-called customizing work after the purchase of the vehicle.

Furthermore, there is a service which takes and offers a photograph of the vehicle at a dealer or the like at the time of purchase of the vehicle. Such a photograph of the vehicle is also an attribute that enables identification of the particular vehicle at a glance. When the photographic image is used as an attribute, the attribute information needs to be associated with the change in the attributes as described above.

Furthermore, there are many users who have an attachment to their vehicles. Such users have a desire to use an image of the vehicle at the time of the change in the attributes as described above as part of an album.

Also in a case of an accident to a vehicle, it is not possible to take appropriate action promptly because, for example, the police are sent to the site of the accident, inspect the vehicle in the accident, and request a wrecker necessary for carrying the vehicle in the accident which wrecker is appropriate in size for the vehicle in the accident.

In addition, although in a case of a failure in the vehicle, it is convenient if a radio communication system as described above is used to automatically transmit a report of the failure and thereby request maintenance service, simply reporting the occurrence of the failure by such a failure report has the same problems as described above.

Specifically, in order to repair the failure promptly on the spot, it is necessary to prepare necessary replacement parts in advance. In some cases, the failure can be repaired only by maintenance service of the producer of the vehicle. Moreover, depending on the extent of the failure, a wrecker for carrying the vehicle to a repair shop is required. However, if going to the spot for repair after only the occurrence of the failure is reported, it is not possible to deal with the failure quickly and thus not possible to take appropriate action promptly.

SUMMARY AND OBJECTS OF THE INVENTION

The present invention has been made in view of the conventional situations described above, and it is accordingly an object of the present invention to make it possible to take appropriate action promptly in response to a report of an abnormality of a vehicle such as a theft, an accident, or a failure.

It is another object of the present invention to associate attribute information that can identify the vehicle with the vehicle at the present time and thereby optimize the attribute information.

Further objects of the present invention will be apparent from the following description. The present invention makes it possible to identify the vehicle and take appropriate action promptly, by performing a communication processing and information processing to provide identifying information for uniquely identifying the vehicle, attribute information indicating attributes of the vehicle itself, and position information indicating the current position of the vehicle. The present invention also makes it possible to optimize the attribute information useful in identifying the vehicle.

The present invention makes it possible to take appropriate action promptly in response to an occurrence of an abnormality of a vehicle such as a theft, an accident, or a failure, by performing communication processing and information processing by providing information on the abnormality detected from the vehicle, identifying information for uniquely identifying the vehicle, attribute information indicating attributes of the vehicle itself, and position information indicating the current position of the vehicle.

Abnormalities of the vehicle include thefts, accidents, and failures.

When dealing with a theft in the present invention, information capable of providing notification of the fact that the vehicle is stolen suffices as abnormality information. The abnormality information may include information on the time of the theft, which information is obtained by an internal clock in a terminal apparatus or abnormality detecting means, for example, to thereby provide information useful in a subsequent search.

When dealing with an accident in the present invention, information capable of providing notification of the fact that the accident has occurred suffices as abnormality information. The abnormality information may include information on the nature and the extent of the accident, which information is detected by abnormality detecting means (sensor) provided in the vehicle, for example, to thereby provide information useful in subsequently dealing with the accident.

When dealing with a failure in the present invention, information capable of providing notification of the fact that the failure has occurred suffices as abnormality information. The abnormality information may include information on the nature and the part of the failure, which information is detected by abnormality detecting means (sensor) provided on the vehicle, for example, to thereby provide information useful in subsequent repair.

According to the present invention, there is provided a vehicular reporting system including a terminal apparatus included in a vehicle and a control apparatus for receiving a report transmitted by radio from the terminal apparatus. The terminal apparatus has a function of transmitting the report by radio, the report being obtained by associating identifying information for uniquely identifying the vehicle. The identifying information is stored in a memory means. Attribute information for indicating attributes of the vehicle itself is stored in the memory means together with position information for indicating a current position of the vehicle.

Therefore, by receiving the report, the control apparatus can identify the vehicle, identify the attributes of the vehicle, and identify the location of the vehicle. It is thus possible to take necessary action promptly.

According to the present invention described above, the memory means provided in the terminal apparatus for storing the attribute information can output the attribute information stored therein in response to access from outside and also update the attribute information with update attribute information inputted from outside. Therefore, it is possible to optimize the attribute information that is useful in identifying the vehicle, and output an attribute information history such as stored photographic images of the vehicle for use as an album.

According to the present invention described above, the memory means provided in the terminal apparatus for storing the attribute information can be updated with update attribute information inputted at the time of vehicle inspection work. Therefore, only a designated vehicle dealer or the like that carries out the inspection work can update the attribute information by using a designated apparatus or tool, a predetermined access right information or method for access to the memory means or the like. Thus, it is possible to maintain consistency between the vehicle and its attribute information.

According to the present invention, there is provided a vehicular reporting system including a terminal apparatus included in a vehicle and a control apparatus for receiving an abnormality report transmitted by radio from the terminal apparatus. The terminal apparatus has a function of transmitting the abnormality report by radio. The abnormality report is obtained by associating abnormality information from abnormality detecting means included on the vehicle and identifying information for uniquely identifying the vehicle. The identifying information is stored in a memory means. Attribute information for indicating attributes of the vehicle itself is stored in the memory means, and position information for indicating a current position of the vehicle.

Therefore, by receiving the abnormality report, the control apparatus can detect the occurrence of an abnormality in the vehicle, identify the vehicle having the abnormality, identify the attributes of the vehicle having the abnormality, and identify the location where the abnormality has occurred. It is thus possible to take appropriate action promptly such as sending an appropriate report to the police and sending an appropriate request to an appropriate maintenance service.

In addition, according to the present invention, there is provided a vehicular reporting system including a terminal apparatus included in a vehicle, a control apparatus for receiving an abnormality report transmitted by radio from the terminal apparatus and a plurality of base station apparatus for providing a radio communication service to the terminal apparatus. The terminal apparatus has a function of transmitting the abnormality report by radio. The abnormality report is obtained by associating with each other abnormality information from abnormality detecting means included in the vehicle and identifying information for uniquely identifying the vehicle. The identifying information is stored in a memory means. Attribute information for indicating attributes of the vehicle itself is stored in the memory means. The control apparatus has a function of obtaining position information of the transmitter of the abnormality report, the position information being obtained by determining which of the base station apparatus has a service area where the transmitter is located on the basis of the identifying information included in the received abnormality report.

Therefore, by receiving the abnormality report, the control apparatus can detect the occurrence of an abnormality of the vehicle, identify the vehicle having the abnormality, identify the attributes of the vehicle having the abnormality, and identify the location where the abnormality has occurred by using the positioning service of a PHS housing the terminal apparatus, for example. It is thus possible to take appropriate action promptly.

Moreover, according to the present invention, there is provided a vehicular reporting system including a terminal apparatus included in a vehicle and a control apparatus for receiving an abnormality report transmitted by radio from the terminal apparatus. The terminal apparatus has a function of transmitting the abnormality report by radio. The abnormality report is obtained by associating with each other abnormality information from an abnormality detecting means included in the vehicle. Identifying information is provided for uniquely identifying the vehicle. The identifying information is stored in memory means together with position information for indicating a current position of the vehicle. The control apparatus has a function of obtaining attribute information of the transmitter of the abnormality report from a database storing the attribute information of the vehicle itself on the basis of the identifying information included in the received abnormality report.

Therefore, by receiving the abnormality report, the control apparatus can detect the occurrence of an abnormality of the vehicle, identify the vehicle having the abnormality, identify the location where the abnormality has occurred, and identify the attributes of the vehicle having the abnormality by searching the database. It is thus possible to take appropriate action promptly.

Furthermore, according to the present invention, there is provided a vehicular reporting system including a terminal apparatus included in a vehicle a control apparatus for receiving an abnormality report transmitted by radio from the terminal apparatus and a plurality of base station apparatus for providing radio communication service to the terminal apparatus. The terminal apparatus has a function of transmitting the abnormality report by radio. The abnormality report is obtained by associating with each other abnormality information from an abnormality detecting means included in the vehicle and identifying information for uniquely identifying the vehicle. The identifying information is stored in a memory means. The control apparatus has a function of obtaining position information of the transmitter of the abnormality report. The position information is obtained by determining which of the base station apparatus has a service area where the transmitter is located on the basis of the identifying information included in the received abnormality report, and has a function of obtaining attribute information of the transmitter of the abnormality report from a database storing the attribute information of the vehicle itself on the basis of the identifying information included in the received abnormality report.

Therefore, by receiving the abnormality report, the control apparatus can detect the occurrence of an abnormality of the vehicle, identify the vehicle having the abnormality, identify the attributes of the vehicle having the abnormality by searching the database, and identify the location where the abnormality has occurred by using the positioning service of a PHS housing the terminal apparatus, for example. It is thus possible to take appropriate action promptly.

A telephone number of the terminal apparatus is uniquely assigned in a radio communication system, a body (chassis) number of a vehicle inspection certificate, a registration number of the vehicle inspection certificate (number on a license plate), an ID uniquely assigned in the reporting system and the like may be used as the identifying information for uniquely identifying the vehicle. One of such pieces of identifying information or a combination of two or more of such pieces of identifying information may be used.

As the position information, position information obtained by a GPS may be used for the terminal apparatus, and position information obtained by a positioning service of a PHS or the like may be used for the control apparatus, for example.

As the attribute information representing characteristics of the vehicle, the name of the producer, the name of the type of vehicle, the vehicle model, the body color, the model year of the vehicle, the appearance of the vehicle determined by optional parts and the like may be used. One of such pieces of attribute information or a combination of two or more of such pieces of attribute information may be used.

In addition, according to the present invention, there is provided a terminal apparatus of each of the foregoing systems. By including the terminal apparatus in a vehicle and thereby forming a reporting system as described above, it is possible to take action promptly in response to a report from the vehicle, and it is possible for a control apparatus to take appropriate action promptly in response to an abnormality of the vehicle.

Furthermore, according to the present invention, there is provided a method of processing a vehicle report, the method being realized by using a radio communication system and computer information processing. The method comprising the steps of receiving a report from a vehicle, or receiving an abnormality report transmitted by radio in response to an abnormality detected by abnormality detecting means of the vehicle and converting the received report into perceptible information for providing information concerning the nature of the abnormality occurring in the vehicle, identifying the vehicle, providing information concerning the attributes of the vehicle itself, and providing information concerning the current position of the vehicle. The method thus allows an operator operating the control apparatus and personnel requested by the control apparatus to be dispatched to readily grasp information necessary to deal with the occurred abnormality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
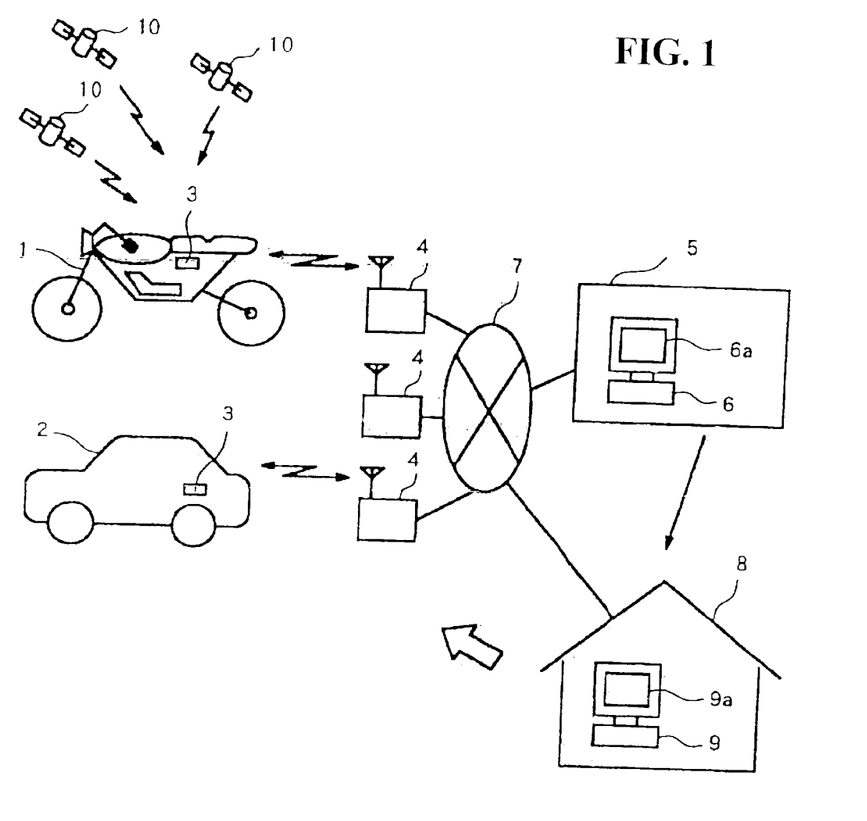
FIG. 1 is a diagram showing a vehicular reporting system according to an embodiment of the present invention.

The present invention will be described concretely on the basis of embodiments thereof. FIG. 1 shows a vehicular reporting system according to the present invention.

In the system of the present invention, a terminal apparatus 3 having a radio communication function is included in a motorcycle 1 and an automobile 2. The terminal apparatus 3 perform radio communication with a radio base station apparatus is housed in a plurality of radio base stations 4 set up by a communication service carrier (telephone company). The terminal apparatus 3 in some of the embodiments to be described below has a positioning function for calculating a current position of the apparatus every moment by receiving radio waves from a plurality of GPS satellites 10. Thus, the current position of the vehicle is known by means of the terminal apparatus 3.

A control apparatus 6 having a display screen 6a is installed in a security center 5 providing security services. The terminal apparatus 3 included in the vehicles can transmit an abnormality report to the control apparatus 6 via the base station apparatus 4 and a communication line network 7.

The communication service carrier of the communication line network 7 performs processing for exchanging the above communications and provides a information for positioning the terminal apparatus 3, as described later.

The security service center 5 is connected via the communication line network 7 to an actual operation center 8 for dispatching necessary personnel, such as the police for handling theft, accidents, and failure, a road service center, a maintenance service center of a vehicle producer, or a wrecker center. The security service center 5 can thereby transmit a dispatching request and information necessary for handling the problems to the actual operation center 8.

In this example, a computer 9 installed in the actual operation center 8 is connected to the control apparatus 6, whereby a request and information from the control apparatus are outputted to the computer 9 and displayed on a screen 9a of the computer 9. However, information communications between the security service center 5 and the actual operation center 8 may be telephonic communications using the telephone. Also, the security service center 5 and the actual operation center 8 may be managed by the same center.

Figure 2:
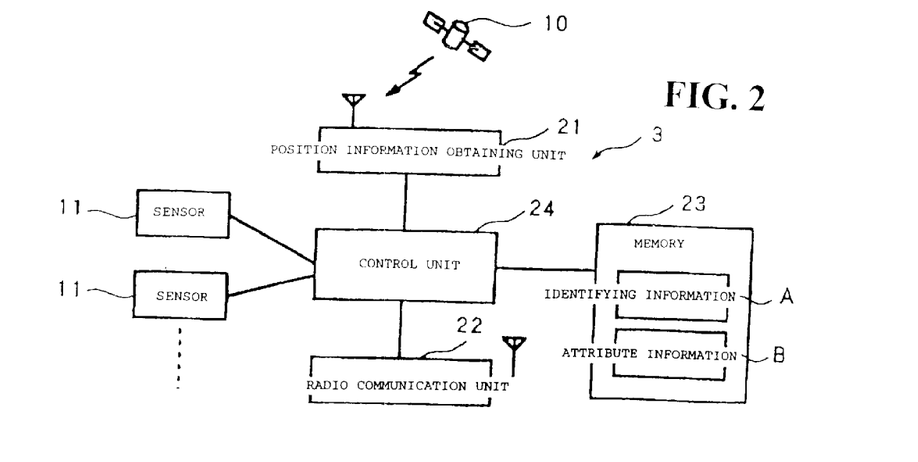
FIG. 2 is a diagram showing a terminal apparatus according to a first embodiment of the present invention.
Figure 3:
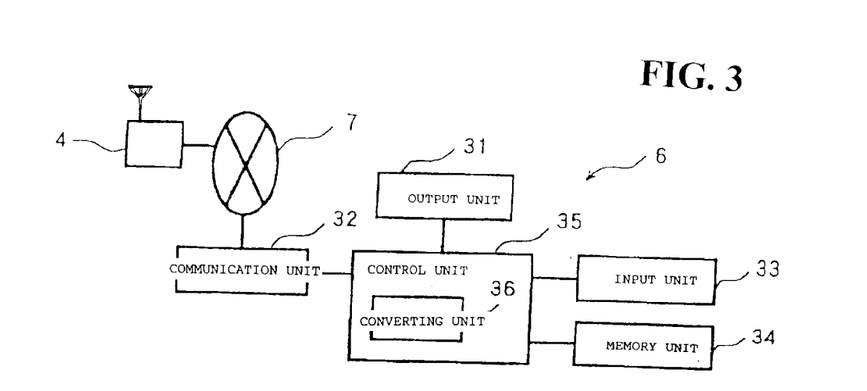
FIG. 3 is a diagram showing a control apparatus according to the first embodiment of the present invention.
Figure 4:
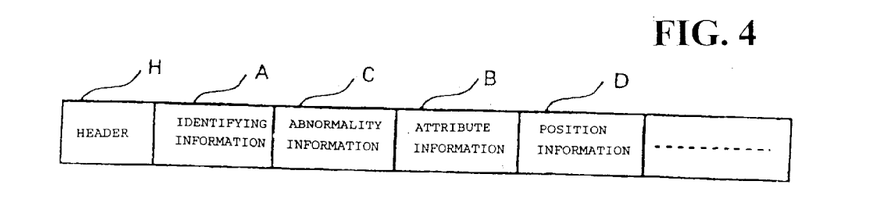
FIG. 4 is a diagram of assistance in explaining an abnormality report according to the first embodiment of the present invention.

FIGS. 2 to 4 show a first embodiment of the present invention. A terminal apparatus 3 in the first embodiment has current position information and attribute information of the terminal apparatus 3, and transmits an abnormality report including the current position information and the attribute information to the control apparatus 6.

As shown in FIG. 2, the terminal apparatus 3 has a position information obtaining unit 21 for performing position calculation processing by receiving radio waves from a GPS satellite 10, a radio communication unit 22 for performing processing of radio communications with the radio base station apparatus 4, a semiconductor memory 23 retaining readable necessary information and a control unit 24 for effecting centralized control of the functional means 21 to 23 and performing an abnormality report processing in response to an abnormality signal from abnormality detecting sensors 11 provided at various positions of the vehicle.

The control unit 24 is formed by a microcomputer having a processor and a memory, and is preprogrammed for the above control and processing.

The memory 23 stores predetermined identifying information A allowing unique identification, such as a telephone number assigned to the terminal apparatus 3, and attribute information B allowing identification of the name of the producer of the vehicle, the type of the vehicle and the like.

A type of sensor for providing information according to the nature of the abnormality of an object of detection, the type of the vehicle including the terminal apparatus 3, and the like is used as the abnormality detecting sensor 11. The abnormality detecting sensors 11 are provided at necessary positions of the vehicle.

Specifically, when a theft of a vehicle is to be detected, a sensor capable of detecting a change occurring in the vehicle which change can be considered to be caused by theft is used. Such a sensor could be a vibration detecting sensor for outputting an abnormality signal when a vibration exceeding a certain magnitude occurs in the vehicle with the ignition key removed, or a rotation detecting sensor of a motorcycle, in particular, for outputting an abnormality signal when a rotation of a wheel exceeding a certain distance occurs with the ignition key removed.

When an accident is to be detected, a sensor capable of detecting a change occurring in the vehicle which change can be considered to be caused by an accident is used, such as a distortion detecting sensor for outputting an abnormality signal when a distortion exceeding a certain level occurs in the vehicle, a tilt detecting sensor of a motorcycle, in particular, combined with a timer, as disclosed in Patent Application No. 2000-148857, for outputting an abnormality signal when a tilt exceeding a certain level occurs in the vehicle for a certain period of time or more, a combination of an acceleration detecting sensor and a tilt detecting sensor for outputting an abnormality signal when a tilt exceeding a certain level occurs in the vehicle at a certain acceleration or more, or a combination of an acceleration detecting sensor and a disconnection detecting sensor for outputting an abnormality signal when a wiring line of an electrical system is disconnected at a certain acceleration or more.

When a failure is to be detected, a sensor capable of detecting a change occurring in the vehicle which change can be considered to be caused by a failure is used, such as a sensor for outputting an abnormality signal in response to a result of self-diagnosis by an electronic control unit of an engine, a temperature detecting sensor for outputting an abnormality signal when engine exhaust temperature, engine lubricating oil, or engine cooling water exceeds a certain value, a pressure detecting sensor for outputting an abnormality signal when the pressure of the engine lubricating oil exceeds a certain value, or a pressure detecting sensor for outputting an abnormality signal when the tire air pressure is lower than a certain value.

In carrying out the present invention, the sensor may deal with all conditions relating to theft, accidents, and failure, or may deal with part of the abnormalities, such as only failure. The sensors described above are selected according to the setting.

As shown in FIG. 3, the control apparatus 6 has an output unit 31 having a display screen 6a for visually outputting information and a speaker for audibly outputting information in the form of an alarm or the like. A communication unit 32 is provided for performing processing of communication with the communication line network 7. An input unit 33 is provided for receiving operational input from an operator. A memory unit 34 is formed by a semiconductor memory retaining readable necessary information such as abnormality report history. A control unit 35 is provided for effecting centralized control of the functional means 31 to 34.

The control unit 35 is formed by executing predetermined programs by means of computer hardware having a processor and a memory, and the control unit 35 also has a converting function 36 for converting abnormality report information received from the terminal apparatus 3 into operator perceptible information to be outputted from the output unit 31.

Operation of the thus formed abnormality reporting system will next be described. First, when an abnormality occurs in the vehicle 1 or 2 and the abnormality is detected by a sensor 11 of the terminal apparatus, the control unit 24 transmits an abnormality report by radio from the radio communication unit 22 in response to an abnormality signal inputted from the sensor 11.

The abnormality report includes contents as shown in FIG. 4, and is transmitted by radio in a format in accordance with a protocol for a system of radio communication with the base station apparatus 4.

Specifically, the abnormality report includes header information H including information necessary for radio communication control and an address (telephone number) of the control apparatus to receive the report. Identifying information A and attribute information B that is read from the memory 23. Abnormality information C for indicating an occurrence of the abnormality. Position information D is obtained by the position information obtaining unit 21 at the time of the input of the abnormality signal. The control unit 24 transmits these pieces of information by radio in the form of a frame in which the pieces of information are associated with each other.

Incidentally, while the abnormality information C may be information simply indicating the occurrence of the abnormality, the abnormality information C is preferably information indicating the type and nature of the abnormality identified by the type of the sensor 11.

When the control apparatus 6 receives the abnormality report by means of the communication unit 32 via the base station apparatus 4 and the communication line network 7, the control unit 35 converts data of the abnormality report into a perceptible data format by means of the converting function 36. The control apparatus 6 then outputs a display notifying the occurrence of the abnormality on the screen 6a and outputs an alarm notifying the occurrence of the abnormality from the speaker, thus displaying and outputting information identifying the vehicle having the abnormality on the screen 6a on the basis of the identifying information A included in the abnormality report, displaying and outputting attributes of the vehicle on the screen 6a on the basis of the attribute information B included in the abnormality report, and displaying and outputting the current position of the vehicle on the screen 6a on the basis of the position information D included in the abnormality report.

When the abnormality information C includes the type and nature of the abnormality, the type and nature of the abnormality are also outputted and displayed on the screen 6a. The received abnormality report is stored by the control unit 35 in the memory unit 34 as abnormality report history, and the abnormality report can be outputted as required in response to an input of an instruction from the input unit 33.

Thus, the operator of the security service center 5 can instantly grasp what vehicle has the abnormality and where the abnormality has occurred, as well as characteristics and attributes of the vehicle, by the output from the output unit 31, and on the basis of the information, the operator can thereafter take appropriate action promptly and properly.

Specifically, when dealing with a theft, the operator can notify the theft of the vehicle to the owner of the vehicle registered in advance with the security service center 5 and send the police 8 a report specifying the place of the theft as well as the type of the vehicle and the body color of the vehicle. When dealing with an accident, the operator can provide notification that an accident has occurred to an emergency contact registered in advance with the security service center 5 and send the police and the fire department 8 a report specifying the site of the accident as well as the type of the vehicle and the body color of the vehicle. When dealing with a failure, the operator can send a request to a maintenance service center 8 selected according to the producer of the vehicle and the type of the vehicle.

Incidentally, when the abnormality information includes information indicating the failure part and the extent of the failure, it is possible to provide the information when sending the request to the maintenance service center 8, and thus prepare necessary replacement parts and a wrecker for carrying the vehicle when dispatching necessary personnel.

Figure 5:
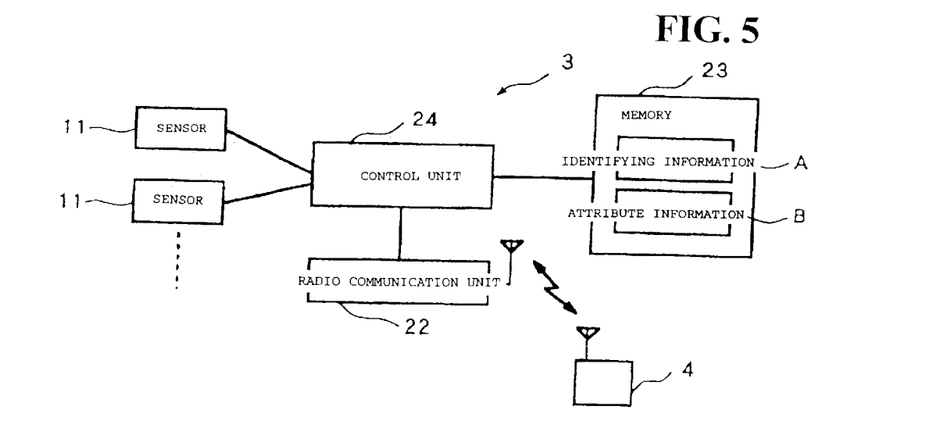
FIG. 5 is a diagram showing a terminal apparatus according to a second embodiment of the present invention.
Figure 6:
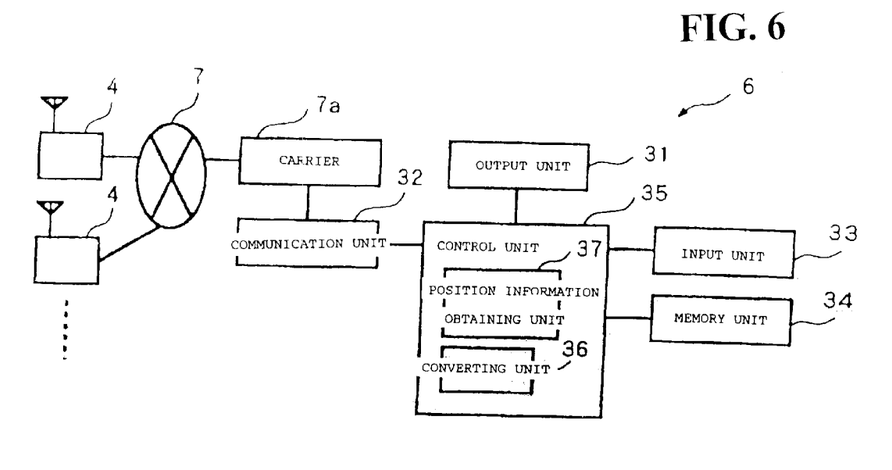
FIG. 6 is a diagram showing a control apparatus according to the second embodiment of the present invention.
Figure 7:
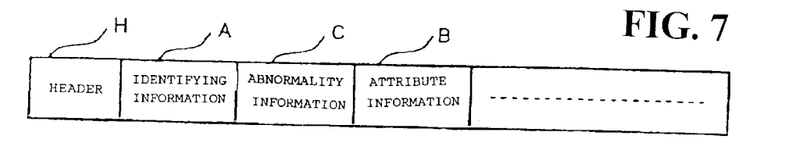
FIG. 7 is a diagram of assistance in explaining an abnormality report according to the second embodiment of the present invention.

FIGS. 5 to 7 show a second embodiment of the present invention. In this example, although a terminal apparatus 3 has attribute information, current position information is obtained by a control apparatus 6 by using positioning service provided by a communication service carrier 7a. The description below will be made of parts different from those of the first embodiment. The same parts as in the first embodiment are identified by the same reference numerals, and their repeated description will be omitted.

A position information obtaining unit 21 using GPS is omitted in the terminal apparatus 3 in this example, as shown in FIG. 5. When an abnormality is detected by a sensor 11, an abnormality report not including position information but including header information H, identifying information A, abnormality information C, and attribute information B is transmitted by radio from the terminal apparatus 3, as shown in FIG. 7.

As shown in FIG. 6, a control unit 35 of the control apparatus 6 in this example has a position information obtaining function 37. When the control apparatus 6 receives the abnormality report, the position information obtaining function 37 effects control to transmit a positioning request specifying the identifying information (telephone number of the terminal apparatus) included in the abnormality report from a communication unit 32 to the communication service carrier 7a. The communication service carrier 7a then obtains position information by determining which of installed base station apparatus 4 has a communication area where the terminal apparatus 3 identified by the identifying information is located. The position information is received from the communication unit 32. A converting function 36 performs converting processing on the identifying information A, the abnormality information C, and the attribute information B included in the received abnormality report, and the position information of the terminal apparatus 3 (that is, the vehicle including the terminal apparatus 3), or the transmitter of the report, which position information is obtained from the communication service carrier 7a, and then outputs resulting information from an output unit 31 in an operator perceptible form.

Thus, in the second embodiment, as in the first embodiment, the operator of the security service center 5 can instantly grasp what vehicle has the abnormality and where the abnormality has occurred, as well as characteristics and attributes of the vehicle, by the output from the output unit 31, and on the basis of the information, the operator can thereafter take appropriate action promptly and properly.

Figure 8:
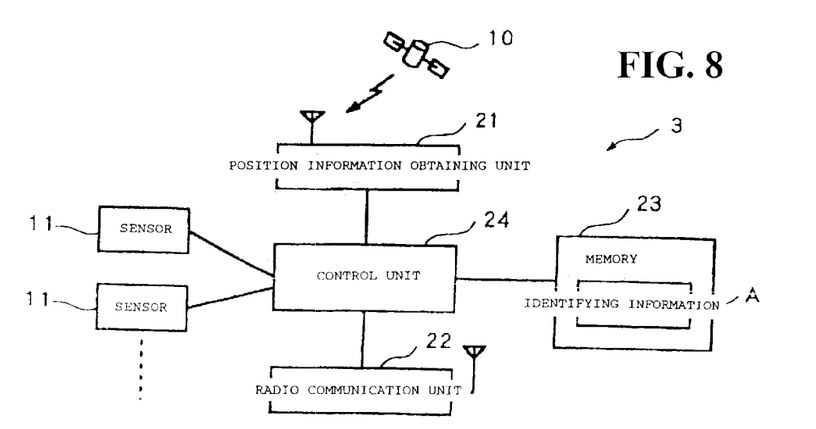
FIG. 8 is a diagram showing a terminal apparatus according to a third embodiment of the present invention.
Figure 9:
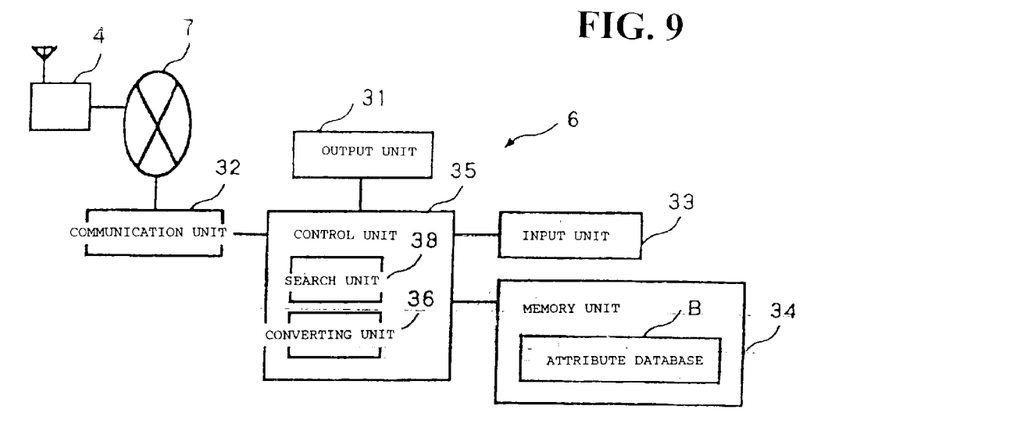
FIG. 9 is a diagram showing a control apparatus according to the third embodiment of the present invention.
Figure 10:
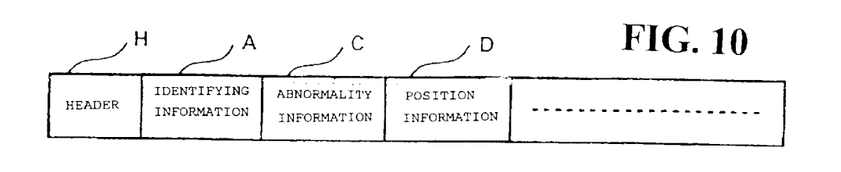
FIG. 10 is a diagram for assisting in explaining an abnormality report according to the third embodiment of the present invention.

FIGS. 8 to 10 show a third embodiment of the present invention. In this example, although a terminal apparatus 3 obtains position information D, attribute information B is handled by a control apparatus 6 by means of a database provided in advance. The description below will be made of parts different from those of the first embodiment. The same parts as in the first embodiment are identified by the same reference numerals, and their repeated description will be omitted.

As shown in FIG. 8, the terminal apparatus 3 in this example has a position information obtaining unit 21 that uses GPS. A memory 23 stores identifying information A but does not store attribute information. When an abnormality is detected by a sensor 11, an abnormality report not including the attribute information B but including header information H, the identifying information A, abnormality information C, and the position information D is transmitted by radio from the terminal apparatus 3, as shown in FIG. 10.

As shown in FIG. 9, a control unit 35 of the control apparatus 6 in this example has a database search function 38. When the control apparatus 6 receives the abnormality report, the search function 38 effects control to search an attribute database B stored in a memory unit 34 on the basis of the identifying information included in the abnormality report and thereby extract corresponding attribute information. Incidentally, the attribute database B is formed by accumulating attribute information of vehicles including terminal apparatus 3 to be provided with the service by using identifying information of the terminal apparatus as a key.

A converting function 36 performs converting processing on the identifying information A, the abnormality information C, and the position information D included in the received abnormality report, as well as the attribute information of the vehicle, or the transmitter of the report, which attribute information is obtained by the search, and then outputs resulting information from an output unit 31 in an operator perceptible form.

Thus, in the third embodiment, as in the foregoing embodiments, the operator of the security service center 5 can instantly grasp what vehicle has the abnormality and where the abnormality has occurred, as well as characteristics and attributes of the vehicle, by the output from the output unit 31, and on the basis of the information, the operator can thereafter take appropriate action promptly and properly.

Figure 11:
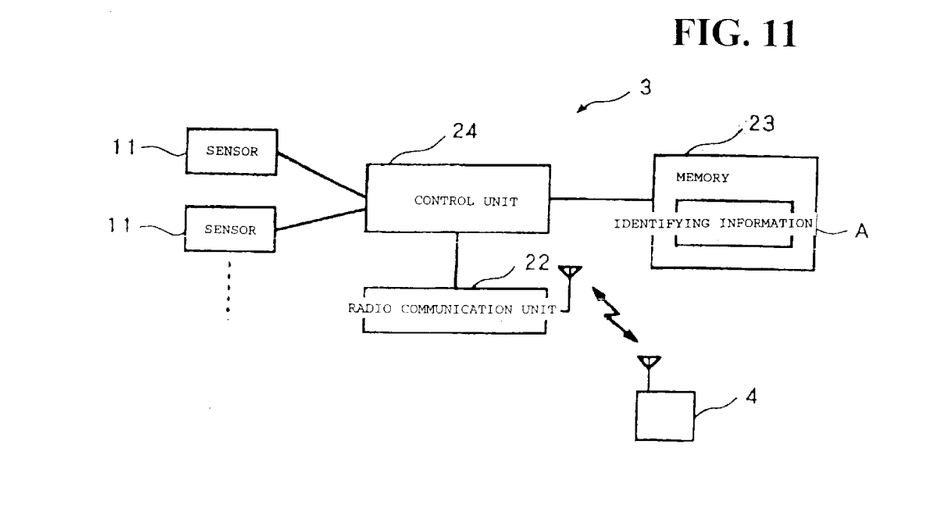
FIG. 11 is a diagram showing a terminal apparatus according to a fourth embodiment of the present invention.
Figure 12:
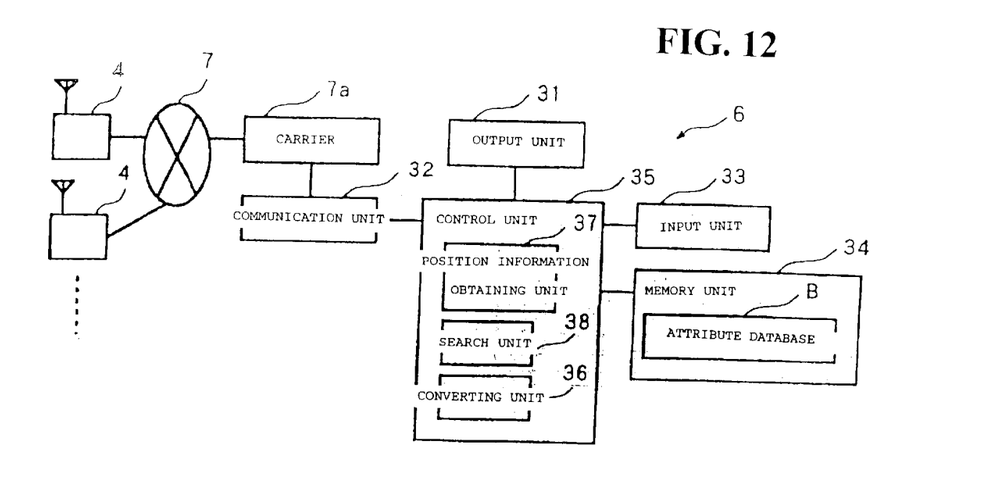
FIG. 12 is a diagram showing a control apparatus according to the fourth embodiment of the present invention.
Figure 13:
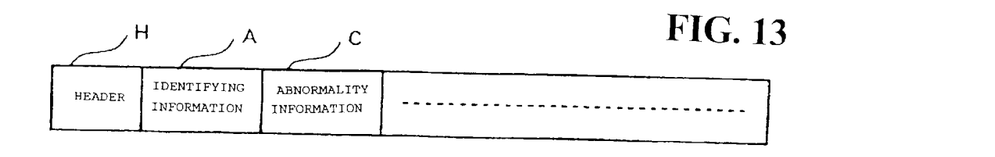
FIG. 13 is a diagram for assisting in explaining an abnormality report according to the fourth embodiment of the present invention.

FIGS. 11 to 13 show a fourth embodiment of the present invention. In this example, although a terminal apparatus 3 retains identifying information A, processing for obtaining position information D and attribute information B is performed by a control apparatus 6. The description below will be made of parts different from those of the first to third embodiments. The same parts as in the embodiments are identified by the same reference numerals, and their repeated description will be omitted.

As shown in FIG. 11, the terminal apparatus 3 in this example does not have a position information obtaining unit 21 using GPS. Also, a memory 23 stores identifying information A but does not store attribute information. When an abnormality is detected by a sensor 11, an abnormality report not including the position information D and the attribute information B but including header information H, the identifying information A, and abnormality information C is transmitted by radio from the terminal apparatus 3, as shown in FIG. 13.

As shown in FIG. 12, a control unit 35 of the control apparatus 6 in this example has a converting function 36, a position information obtaining function 37, and a database search function 38. When the control apparatus 6 receives the abnormality report, the position information obtaining function 37 effects control to obtain, from the communication service carrier 7a, the current position information of the vehicle, or the transmitter of the report, on the basis of the identifying information (telephone number of the terminal apparatus) included in the abnormality report, and the search function 38 effects control to obtain corresponding attribute information from an attribute database B stored in a memory unit 34 on the basis of the identifying information included in the abnormality report.

The converting function 36 performs converting processing on the identifying information A and the abnormality information C included in the received abnormality report, as well as the attribute information B and the position information D of the vehicle, or the transmitter of the report, which information is obtained by the above control processing, and then outputs the resulting information from an output unit 31 in an operator perceptible form.

Thus, in the fourth embodiment, as in the foregoing embodiments, the operator of the security service center 5 can instantly grasp what vehicle has the abnormality and where the abnormality has occurred, as well as characteristics and attributes of the vehicle, by the output from the output unit 31, and on the basis of the information, the operator can thereafter take appropriate action promptly and properly.

Figure 14:
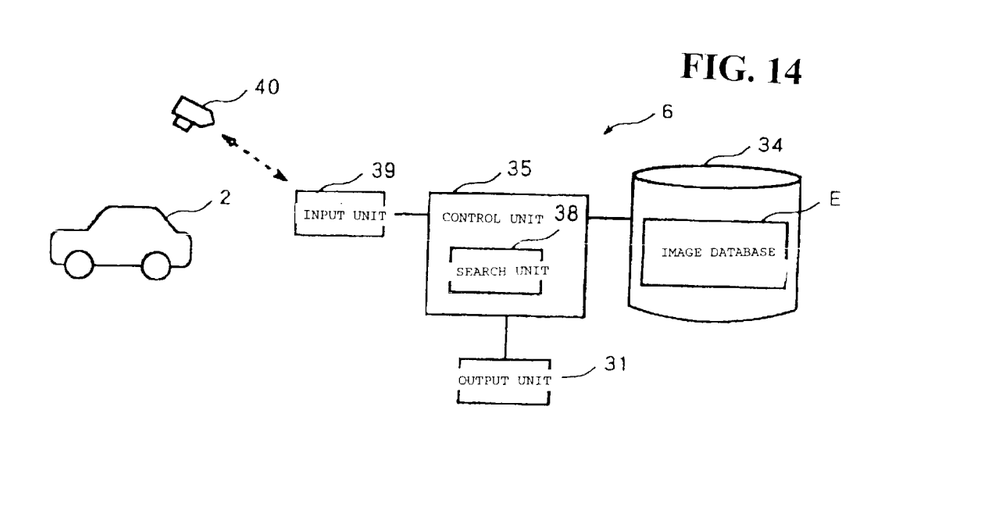
FIG. 14 is a diagram showing a control apparatus according to an application of the present invention.
Figure 15:
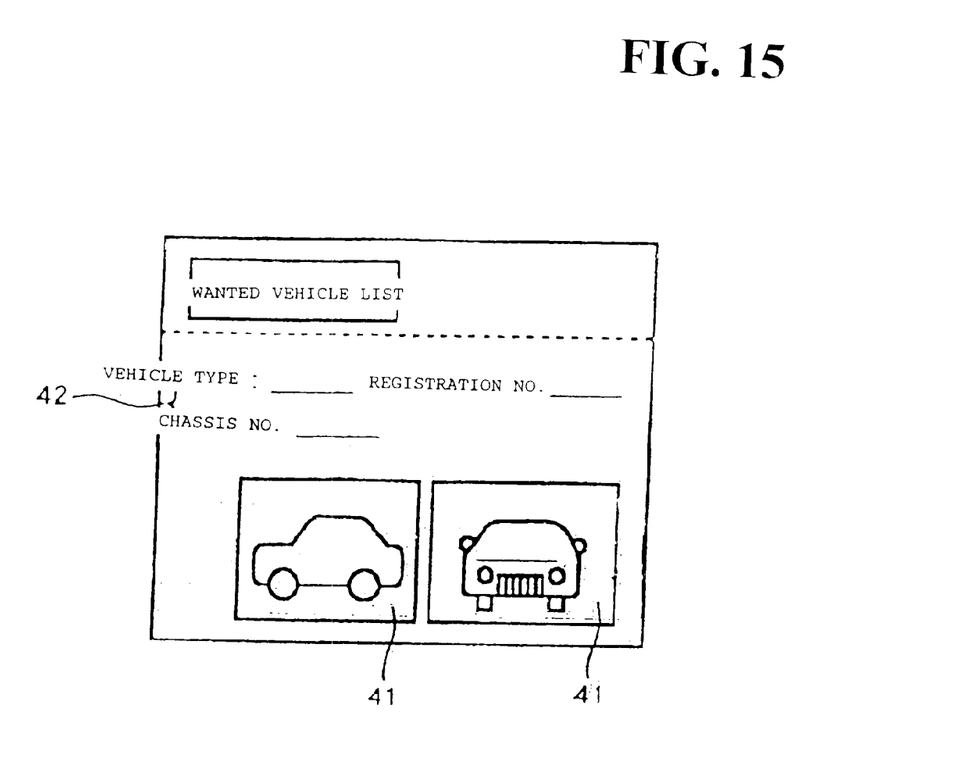
FIG. 15 is a diagram for assisting in explaining a home page image according to the application of the present invention.

FIG. 14 and FIG. 15 show an application using the functions of the control apparatus 6. In this example, image data of vehicles obtained by photographing by a camera 40 is captured from an input unit 39, and then accumulated and stored in a memory unit 34 as an image database E, so that pertinent image data can be extracted by a search function 38 from the database E as required. Specifically, the image data of vehicles obtained by photographing in association with identifying information is registered in the image database E, so that the image data of each of the vehicles can be read by using the identifying information as a key.

In addition, data such as the type, the chassis number, and the registration number of each of the vehicles is accumulated in the image database E in association with the image data of the vehicle.

An output unit 31 has a function of communication access to the Internet. When the security service center 5 receives a report of a theft, the image data of the stolen vehicle and the data associated with the image data are read from the database E on the basis of the report, and the information can be presented from the output unit 31 to a home page on the Internet. For example, as shown in FIG. 15, by setting up a home page referred to as a wanted vehicle list on the Internet, and including an image 41 of the stolen vehicle and information 42 such as the type, the chassis number, and the registration number of the vehicle on the page, it is possible to urge the general public to provide information.

In the foregoing embodiments, abnormality detecting means is provided in the vehicle to report an abnormality that has occurred in the vehicle, such as a failure. However, identifying information, position information, and attribute information may be transmitted to the terminal apparatus by radio regularly or at any time, without providing such abnormality detecting means. This can also realize means effective in searching for the vehicle when the vehicle is stolen, for example. In addition, the terminal apparatus may be provided with a function of sending such a report in response to a received request so that the terminal apparatus sends the report in response to a report request transmitted from the control apparatus.

The memory of the terminal apparatus or the external database may be a readable and writable memory device so that attribute information stored therein can be accessed from outside the system, such as by a dealer or a user, for output and input from a terminal of the memory device or the like. This facilitates update processing for optimizing the stored attribute information by reflecting a change in the attribute information resulting from a change in the appearance or the like of the vehicle after purchase of the vehicle. Furthermore, the attribute information stored in the update processing may be stored in the memory device as a history, for example, so that the newest attribute information is provided in response to access from inside the system for sending a report, while the attribute information stored as a history is provided for output in response to outside access. Then it is possible to use vehicle appearance attributes such as pictures of the vehicle changed by customizing work done by the user or the like as an album.

In addition, the attribute information stored in the memory device as described above may be updated at the time of inspection of the vehicle only by an apparatus, a tool, an access ID, or an access procedure specially owned by a vehicle dealer or the like that inspects the vehicle, for example. This makes it possible to prevent an inappropriate update that may result in inconsistency between the actual vehicle and its attribute information, and thus maintain reliability of the stored attribute information. Examples of simple methods for this include making an access terminal of the memory device into a special shape and preparing a plug connectable to the terminal at the time of inspection work, allowing a box such as a casing that houses the memory device to be opened only by a special tool and preprogramming an access ID or an access procedure into the memory device and allowing access only by a corresponding ID input or procedure.

As described above, according to the present invention, attribute information is included in a report of an abnormality such as a theft, an accident, or a failure from a vehicle, and the information of the abnormality report is converted into perceptible information for output. Therefore, it is possible to grasp characteristics of the vehicle as well as the location of the vehicle such as the place where the abnormality has occurred, and thereby take appropriate action on the basis of the abnormality report promptly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular reporting system comprising:
a terminal apparatus included in a vehicle; and
a control apparatus for receiving a report transmitted by radio from said terminal apparatus;
wherein said terminal apparatus transmits the report by radio, the report is obtained by associating identifying information for uniquely identifying the vehicle, the identifying information being stored in memory means, attribute information for indicating attributes of the vehicle itself, the attribute information being stored in the memory means, and position information for indicating a current position of the vehicle,
wherein the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

2. The vehicular reporting system according to claim 1, wherein the memory means provided in said terminal apparatus for storing the attribute information outputs the attribute information stored therein in response to access from outside, and updates the attribute information with update attribute information inputted from outside.

3. The vehicular reporting system according to claim 2, wherein the memory means provided in said terminal apparatus for storing the attribute information is updated with update attribute information inputted at the time of vehicle inspection work.

4. The vehicular reporting system according to claim 1, wherein the memory means provided in said terminal apparatus for storing the attribute information is updated with update attribute information inputted at the time of vehicle inspection work.

5. A vehicular reporting system comprising:
a terminal apparatus included in a vehicle; and
a control apparatus for receiving an abnormality report transmitted by radio from said terminal apparatus;
wherein said terminal apparatus transmits the abnormality report by radio, the abnormality report is obtained by associating with each other abnormality information from abnormality detecting means included in the vehicle, identifying information for uniquely identifying the vehicle, the identifying information being stored in memory means, attribute information for indicating attributes of the vehicle itself, the attribute information being stored in the memory means, and position information for indicating a current position of the vehicle,
wherein the terminal apparatus transmits information includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

6. A vehicular reporting system comprising:
a terminal apparatus included in a vehicle;
a control apparatus for receiving an abnormality report transmitted by radio from said terminal apparatus; and a plurality of base station apparatus for providing radio communication service to said terminal apparatus;

wherein said terminal apparatus transmits the abnormality report by radio, the abnormality report being obtained by associating abnormality information from abnormality detecting means included in the vehicle, identifying information for uniquely identifying the vehicle, the identifying information being stored in memory means, and attribute information for indicating attributes of the vehicle itself, the attribute information being stored in the memory means; and said control apparatus obtains position information of the transmitter of the abnormality report, the position information being obtained by determining which of the base station apparatus has a service area where the transmitter is located on the basis of the identifying information included in the received abnormality report, wherein the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

7. A vehicular reporting system comprising:

a terminal apparatus included in a vehicle; and a control apparatus for receiving an abnormality report transmitted by radio from said terminal apparatus;

wherein said terminal apparatus transmits the abnormality report by radio, the abnormality report being obtained by associating abnormality information from abnormality detecting means included in the vehicle, identifying information for uniquely identifying the vehicle, the identifying information being stored in memory means, and position information for indicating a current position of the vehicle; and said control apparatus obtains attribute information of the transmitter of the abnormality report from a database storing the attribute information of the vehicle itself on the basis of the identifying information included in the received abnormality report, wherein, upon failure of a vehicle part, the terminal apparatus transmits information indicating the failed vehicle part to a maintenance service center wherein, the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

8. A vehicular reporting system comprising:

a terminal apparatus included in a vehicle;

a control apparatus for receiving an abnormality report transmitted by radio from said terminal apparatus; and a plurality of base station apparatus for providing radio communication service to said terminal apparatus;

wherein said terminal apparatus transmits the abnormality report by radio, the abnormality report being obtained by associating with each other abnormality information from abnormality detecting means included in the vehicle and identifying information for uniquely identifying the vehicle, the identifying information being stored in memory means; and said control apparatus obtains position information of the transmitter of the abnormality report, the position information being obtained by determining which of the base station apparatus has a service area where the transmitter is located on the basis of the identifying information included in the received abnormality report, and has a function of obtaining attribute information of the transmitter of the abnormality report from a database storing the attribute information of the vehicle itself on the basis of the identifying information included in the received abnormality report, wherein the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

9. A terminal apparatus included in a vehicle for transmitting information, wherein said terminal apparatus transmits a report by radio, the report being obtained by associating identifying information for uniquely identifying the vehicle, the identifying information being stored in memory means, attribute information for indicating attributes of the vehicle itself, the attribute information being stored in the memory means, and position information for indicating a current position of the vehicle, wherein the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

10. The terminal apparatus according to claim 9, wherein the memory means for storing the attribute information outputs the attribute information stored therein in response to access from outside, and updates the attribute information with update attribute information inputted from outside.

11. The terminal apparatus according to claim 10, wherein the memory means for storing the attribute information is updated with update attribute information inputted at the time of vehicle inspection work.

12. The terminal apparatus according to claim 9, wherein the memory means for storing the attribute information is updated with update attribute information inputted at the time of vehicle inspection work.

13. A terminal apparatus included in a vehicle for reporting an abnormality occurring in the vehicle, wherein said terminal apparatus transmits an abnormality report by radio, the abnormality report being obtained by associating abnormality information from abnormality detecting means included in the vehicle, identifying information for uniquely identifying the vehicle, the identifying information being stored in memory means, attribute information for indicating attributes of the vehicle itself, the attribute information being stored in the memory means, and position information for indicating a current position of the vehicle, wherein the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed in the vehicle when the vehicle ignition key is removed.

14. A terminal apparatus included in a vehicle for reporting an abnormality occurring in the vehicle, and using communication service provided by a radio communication system having a plurality of base station apparatus, wherein said terminal apparatus transmits an abnormality report by radio, the abnormality report being obtained by associating abnormality information from abnormality detecting means included in the vehicle, identifying information for uniquely identifying the vehicle, the identifying information being stored in memory means, and attribute information for indicating attributes of the vehicle itself, the attribute information being stored in the memory means, and the abnormality report being transmitted by radio for reception by a control apparatus having a function of obtaining position information of the transmitter of the abnormality report, the position information being obtained by determining which of the base station apparatus has a service area where the transmitter is located on the basis of the identifying information included in the abnormality report, wherein the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

15. A terminal apparatus included in a vehicle for reporting an abnormality occurring in the vehicle, wherein said terminal apparatus transmits an abnormality report by radio, the abnormality report being obtained by associating abnormality information from abnormality detecting means included in the vehicle, identifying information for uniquely identifying the vehicle, the identifying information being stored in memory means, and position information for indicating a current position of the vehicle, and the abnormality report being transmitted by radio for reception by a control apparatus having a function of obtaining attribute information of the transmitter of the abnormality report from a database storing the attribute information of the vehicle itself on the basis of the identifying information included in the abnormality report, wherein, the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

16. A terminal apparatus included in a vehicle for reporting an abnormality occurring in the vehicle, and using a communication service provided by a radio communication system having a plurality of base station apparatus, wherein said terminal apparatus transmits an abnormality report by radio, the abnormality report being obtained by associating abnormality information from abnormality detecting means included in the vehicle and identifying information for uniquely identifying the vehicle, the identifying information being stored in memory means, and the abnormality report being transmitted by radio for reception by a control apparatus having a function of obtaining position information of the transmitter of the abnormality report, the position information being obtained by determining which of the base station apparatus has a service area where the transmitter is located on the basis of the identifying information included in the received abnormality report, and having a function of obtaining attribute information of the transmitter of the abnormality report from a database storing the attribute information of the vehicle itself on the basis of the identifying information included in the received abnormality report, wherein the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

17. A method of processing a vehicle report, said method comprising the steps of:

receiving a report transmitted from a vehicle and an image transmitted from a camera by radio; and converting the received report into perceptible information for identifying the vehicle, for providing attributes of the vehicle itself, and for providing a current position of the vehicle, wherein the terminal apparatus includes a vibration detecting sensor for outputting a signal when a vibration exceeding a certain magnitude occurs in the vehicle when a vehicle ignition key is removed, or a rotation detecting sensor for outputting a signal when a rotation of a wheel exceeding a certain distance occurs in the vehicle when the vehicle ignition key is removed.

18. A method of processing a vehicle report, said method comprising the steps of:

receiving an abnormality report transmitted by radio in response to an abnormality detected by abnormality detecting means of a vehicle; and converting the received abnormality report into perceptible information for providing a nature of the abnormality occurring in the vehicle, identifying the vehicle, for providing attributes of the vehicle itself, and for providing a current position of the vehicle, wherein the abnormality report includes information indicating a vibration exceeding a certain magnitude occurs in the vehicle when a vehicle ignition key is removed, or indicating a rotation of a wheel when the vehicle has exceeded a certain distance when the vehicle ignition key is removed.

* * * * *